United States Patent [19]

Goralnik

[11] 4,217,326
[45] Aug. 12, 1980

[54] METHOD FOR MAKING A CUT GLASS PANEL

[76] Inventor: Charles D. Goralnik, 200 Brynwyck Pl., St. Louis County, Mo. 63141

[21] Appl. No.: 54,169

[22] Filed: Jul. 2, 1979

[51] Int. Cl.² .................... B29C 5/00; B29C 9/00; B29F 1/12
[52] U.S. Cl. .................... 264/254; 264/247; 264/251; 264/261; 264/263; 264/271; 264/275; 264/337; 264/328.6
[58] Field of Search .................... 52/307, 308, 315; 428/38; 264/259, 250, 251, 254, 261, 263, 271, 328, 337, 245–247, 275

[56] References Cited

U.S. PATENT DOCUMENTS

| 2,847,712 | 8/1958 | Pollard et al. | 264/259 |
| 2,991,213 | 7/1961 | Williams | 428/38 |
| 3,382,134 | 5/1968 | Powell | 428/38 |
| 3,420,728 | 1/1969 | Haverstock | 428/38 |
| 4,068,441 | 1/1978 | Shaffer | 52/308 |

Primary Examiner—W. E. Hoag
Attorney, Agent, or Firm—Senniger, Powers, Leavitt and Roedel

[57] ABSTRACT

A method of making a cut glass panel comprising a plurality of glass piece arranged with cames in a predetermined pattern between adjacent edges of the glass pieces and having flanges on both sides of the glass pieces. The method comprises providing a mold having grooving in the upper face thereof in the pattern of the cames, introducing moldable material into the grooving, allowing the moldable material to set in the mold to form the flanges for one side of the glass pieces, and removing the flanges from the mold. The glass pieces are positioned on the same or a similar mold with the edges of each glass piece spaced from the edges of the adjacent glass pieces in the predetermined pattern and with the spaces between adjacent glass pieces above the grooving. Moldable material is introduced in the spaces to fill the grooving and the spaces. The previously formed flanges are positioned on the upper surface of the glass pieces so as to engage the moldable material at the top of the spaces. The moldable material is allowed to set so as to form the flanges on the other side of the glass pieces and the webs of the cames and to bond the flanges on one side of the glass pieces to the cames, and the completed panel is removed from the mold.

6 Claims, 6 Drawing Figures

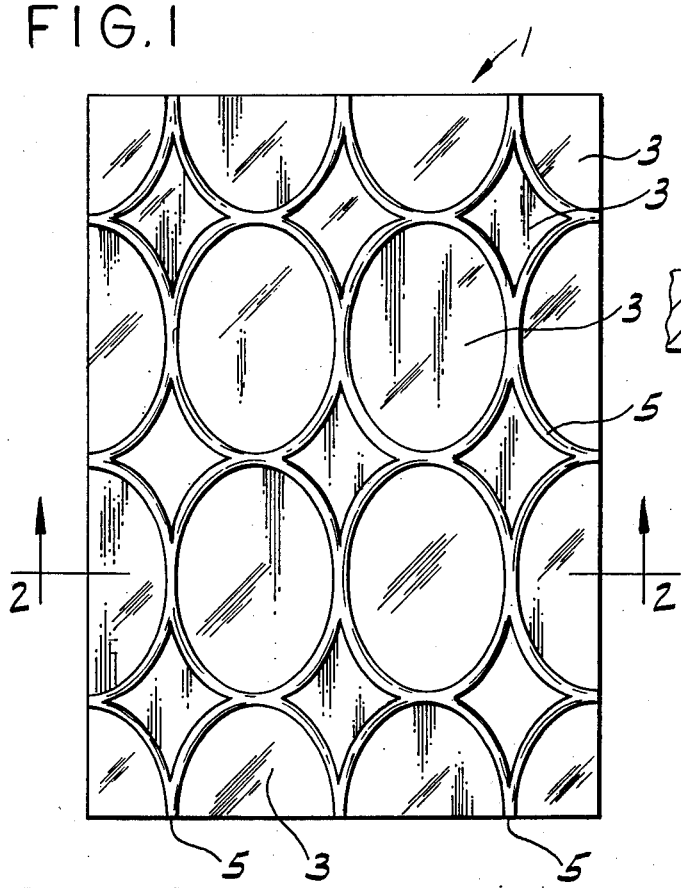
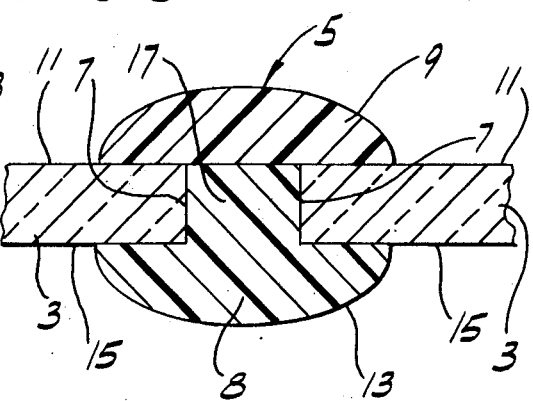
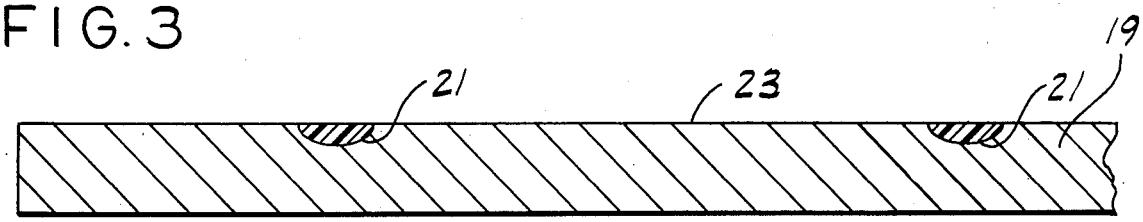
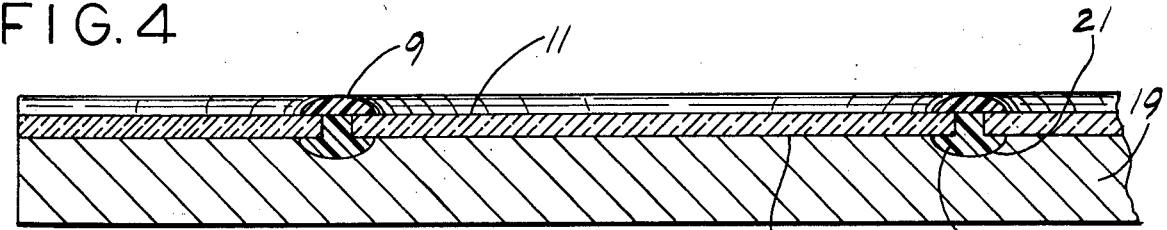
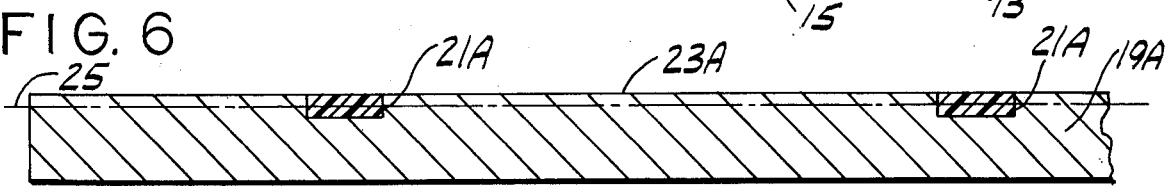

METHOD FOR MAKING A CUT GLASS PANEL

BACKGROUND OF THE INVENTION

This invention relates to cut glass panels, and more particularly to a method of molding cames between the glass pieces of a cut glass panel.

This invention is an improvement over the prior art method of molding cames between glass pieces of a cut glass panel such as shown for example in U.S. Pat. No. 4,068,441 comprising the steps of positioning the glass pieces on a mold having grooving in the upper surface thereof with the edges of each glass piece spaced from the edges of the adjacent glass pieces in a predetermined pattern and with the spaces between adjacent glass pieces above the grooving, introducing adhesive material into the spaces to fill the grooving and the spaces between the glass pieces, and allowing the adhesive to set to form a T-section came having webs and flanges on one side of the glass pieces for securing the glass pieces together into a cut glass panel. When viewed from one side, (i.e., the decorative side) the panel formed by the prior art method simulates a leaded cut glass panel with lead cames between adjacent glass pieces and flanges over the spaces between the glass pieces. However, when viewed from the other side, (i.e., the unfinished side), the prior art panel does not have a flange and, thus, does not resemble a leaded cut glass panel. Moreover, excess adhesive material is often inadvertently spread on the glass pieces and air bubbles often form in the adhesive material at the unfinished side of the panel during the molding process, thereby giving the unfinished side of the panel an undesirable appearance. While it is possible to trim off the excess adhesive and with it some of the air bubbles to improve the appearance of the unfinished side of the prior art glass panel, the panel still is not satisfactory for those applications where the panel is to be viewed from both sides. A further problem with the prior art panel is that in order to achieve sufficient bonding strength between the cames and the pieces of glass, the edges of the glass pieces must be roughened, such as by "frosting" or "penciling" the edges of each glass piece, which operation is costly and time-consuming.

SUMMARY OF THE INVENTION

Among the several objects of this invention may be noted the provision of a method of producing cut glass panels resembling at both sides thereof a leaded cut glass panel, in particular a leaded cut glass panel which has preformed H-section lead cames between the glass pieces; the provision of such a method of producing cut glass panels in which any excess moldable material and any air bubbles entrained in the material during the molding process are not visible from either side of the glass panel; the provision of such a method for producing cut glass panels having sufficient structural strength and air impermeability without the operation of roughening the edges of the glass pieces; and the provision of such a method which is less costly and less time-consuming than the prior art methods.

Briefly, the method of this invention of making a cut glass panel having a plurality of glass pieces arranged with cames in a predetermined pattern comprises providing a mold having grooving in the upper face thereof in the pattern of the cames, introducing moldable material into the grooving in the upper surface of the mold to fill the grooving, which grooving is of a crosssection corresponding to the cross-section of the flanges, allowing the moldable material to set in the mold to form the flanges for one side of the glass pieces and removing the flanges from the mold, positioning the glass pieces on the same or a similar mold with the edges of each glass piece spaced from the edges of the adjacent glass pieces in the predetermined pattern and with the spaces between adjacent glass pieces above the grooving, introducing sufficient moldable material between the edges of the glass pieces to fill the grooving and the spaces between the adjacent glass pieces and positioning the flanges on the upper surface of the glass pieces so as to engage the moldable material at the top of the spaces between adjacent glass pieces, then allowing the moldable material to set in the grooving to form the flanges for the other side of the glass pieces, to set in the spaces between the glass pieces to form the webs of the cames and to set at the top of the spaces between the glass pieces, thereby bonding the flanges for one side of the glass pieces to the webs of the cames, and then removing the glass pieces bonded together by the cames from the mold.

Other objects and features will be in part apparent and in part pointed out hereinafter.

BRIEF DESCRIPTION OF THE DRAWINGS

FIG. 1 is an elevation of a cut glass panel made according to the method of this invention;

FIG. 2 is an enlarged section on line 2—2 of FIG. 1 with parts removed;

FIG. 3 is an enlarged section of a mold with grooving therein showing flanges for one side of the cut glass panel cast in the grooving;

FIG. 4 is a view similar to FIG. 3 but showing glass pieces on the mold and the flanges previously formed on the glass pieces;

FIG. 5 is an enlarged section of a portion of the panel of FIG. 2 showing the flanges on both sides of the glass pieces and a web between the glass pieces connecting the flanges; and FIG. 6 is a view similar to FIG. 3 but showing a mold with grooving of an alternative cross-section.

Corresponding reference characters indicate corresponding parts throughout the several views of the drawings.

DESCRIPTION OF THE PREFERRED EMBODIMENT

Referring to the drawings, there is generally indicated at 1 a cut glass panel made according to the method of this invention, comprising a plurality of glass pieces 3 arranged with cames 5 in a predetermined pattern between adjacent edges 7 of the glass pieces. While the shape of the individual glass pieces 3 and the pattern of the spacings between the edges 7 of the glass pieces may vary according to the desired appearance of the cut glass panel 1, the width of the spacings for any given panel should be substantially uniform throughout the panel 1. The cames 5 are of a moldable material 8, such as a two-part epoxy resin, and each came comprises flanges 9 at one side 11 of the glass pieces 3, flanges 13 at the other side 15 of the glass pieces 3 and a web 17 between the flanges 9 and 13 (see FIG. 5).

In the method of making the glass panel 1, a mold 19 having grooving 12 in a upper face 23 thereof in the pattern of the cames 5 is provided. Preferably the upper face of the mold 19 (i.e., the surface of the mold defining the grooving) is made of a silicone rubber material, which material does not react with epoxy resin and is resistant to heat which may be applied to the mold 19 to speed the setting of thermosetting moldable materials such as epoxy resin. Sufficient epoxy resin 8 is then introduced into the grooving 21 in the upper face 23 of the mold to fill the grooving. The grooving is of a cross-sectional shape corresponding to the desired cross-sectional shape of the flanges 9 and 13 of the cames 5. Grey pigment may be added to the epoxy resin to give it the appearance of lead. A filler material having a coefficient of expansion similar to that of glass, such as ground glass, magnesium oxide or limestone, may also be added to the epoxy resin to reduce stress in the cames 5 in the cut glass panel 1 caused by changes in the temperature of the panel 1. The epoxy resin 6 is then allowed to set in the mold 19 to form the flanges 9 for one side 11 of the glass pieces 3. The period necessary for the setting of thermosetting moldable material such as epoxy resin can be shortened by heating the panel during the setting by conventional heating means such as infrared heat lamps (not shown). Once set, the array of flanges 9 is removed from the mold.

Thereafter, the glass pieces 3 which may be beveled on one or on both sides thereof are positioned on the mold 19 or on a second mold similar to the mold 19 with the edges 7 of each glass piece spaced from the edges 7 of the adjacent glass pieces in the predetermined pattern and with the spaces between adjacent glass pieces 3 above the grooving 21. The glass pieces may be releasably secured to the upper face 23 of the mold 19 by conventional means, such as vacuum means or mechanical locking levers (not shown). Epoxy resin 8 is then introduced between the glass pieces 3 in sufficient quantity to fill the grooving 21 in the mold and the spaces between adjacent glass pieces 3. Any excess material introduced into the spaces between the glass pieces 3 will overflow the spaces and spread outwardly from the spaces over the upper surface (i.e., side 11) of the glass pieces 3. The array of flanges 9 for the side 11 of the glass pieces 3 is then placed on the upper surface of the glass pieces 3 so as to engage the epoxy resin at the top of the spaces and any excess epoxy resin on the upper surface of the glass pieces 3. The epoxy resin 8 is allowed to set in the grooving 21 to form the array of flanges 13 for the other side 15 of the glass pieces, to set in the spaces between the glass pieces 3 to form the webs 17 of the cames 5 and to set at the top of the spaces between the glass pieces, thereby bonding the flanges 9 for one side 11 of the glass pieces to the webs 17 of the cames 5. The panel 1 may be heated to hasten the setting of the epoxy resin. During setting, the moldable material, such as epoxy resin, having adhesive properties will bond to the edges 7 of the glass pieces and to portions of the side 15 of the glass pieces adjacent the edges 7 so as to make the spaces between the glass pieces 7 air impermeable. The bonding of the cames 5 to the glass pieces 3 together with providing flanges 9 and 13 on both sides of the cut glass panel 1 provide adequate structural strength for the panel 1 without the costly and time-consuming prior art method step of roughening the edges 7 of the glass pieces, as by "frosting" or "penciling". In addition, during setting of the epoxy resin any air entrained in the epoxy resin that rises in the form of bubbles to the lower surface of the flanges 9 is hidden from view from side 11 of the panel, if the flanges 9 are opaque, as is preferred. Upon the setting of the epoxy material 8, the panel 1 with the cames 5 between the glass pieces is 3 is removed from the mold 19.

Prior to positioning the array of flanges 9 on the upper surface (i.e., side 11) of the glass pieces 3, it is often desirable to invert the flanges 9 so that the upper surface of the flanges when in the mold become the surfaces of the flanges 9 engaging the upper surface of the glass pieces on the mold. To provide the necessary correspondence of the flanges 9 when inverted to the grooving 21 in the mold 19, either the predetermined pattern in the mold must be a mirror image about a central plane thereof, or there must be two molds, the first mold (i.e., the mold in which the flanges 9 are formed) having grooving in the upper face thereof in a pattern constituting a mirror image of the predetermined pattern of the cames 5 the second mold (i.e., the mold in which the flanges 13 are formed) having grooving in the upper face thereof in the predetermined pattern of the cames. It is, however, possible to form the panel 1 without inverting the flanges 9. When a cut glass panel with only one decorative side is needed, flanges 9 such as those cast in mold 19 (see FIG. 3) can be positioned on the upper surface (i.e., side 11) of the glass pieces 3 without inverting the flanges 9. While the cames 5 would not be symmetrical about a central plane and air bubbles at the upper surface of the flanges 9 might be visible from the side 11 of the glass panel 1, such a panel would have sufficient structural strength and air impermeability. When a cut glass panel is to be viewed from both sides, it is nonetheless possible to make the panel without inverting the flanges 9 either by dressing the outer surface of the flanges 9 to resemble that of the flanges 13 or by casting the flanges in a mold (see FIG. 6) having grooving 21A in the upper face 23A thereof of a cross-sectional shape symmetrical about a central grooving plane 25 parallel to the upper face 23A of the mold 19A.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

What is claimed is:

1. A method of making a cut glass panel comprising a plurality of glass pieces arranged with cames in a predetermined pattern between adjacent edges of the pieces and having flanges on both sides of the glass pieces; said method comprising:

providing a mold having grooving in the upper face thereof in the pattern of the cames, introducing moldable material into the grooving in the upper surface of the mold to fill the grooving, the grooving being of a cross-sectional shape corresponding to the cross-sectional shape of the flanges;

allowing the moldable material to set in the mold to form the flanges for one side of the glass pieces;

removing said flanges from the mold;

positioning the glass pieces on the same or a similar mold with the edges of each glass piece spaced from the edges of the adjacent glass pieces in the predetermined pattern, the spaces between adjacent glass pieces being above the grooving;

introducing sufficient moldable material between the edges of the glass pieces to fill the grooving and to fill the spaces between the adjacent glass pieces;

positioning said flanges on the upper surface of the glass pieces so as to engage the moldable material at the top of the spaces between adjacent glass pieces;

allowing the moldable material to set in the grooving to form the flanges for the other side of the glass pieces, to set in the spaces between the glass pieces to form the webs of the cames and to set at the top of the spaces between the glass pieces, thereby bonding said flanges for said one side of the glass pieces to the webs of the cames; and removing the glass pieces bonded together by the cames from the mold.

2. The method of claim 1 further comprising the step of inverting said flanges for one said one side of the glass pieces prior to positioning them on the glass pieces, so that the upper surfaces of said flanges for said one side of the glass pieces when in the mold become the surfaces engaging the upper surfaces of the glass pieces, said predetermined pattern being a mirror image about a plane bisecting the pattern.

3. The method as set forth in claim 1 wherein said flanges for one side of the glass pieces are formed in a first mold having grooving in the upper face thereof in a pattern constituting a mirror image of the pattern of the cames, said flanges for the other side of the glass pieces being formed in a second mold having grooving in the upper face thereof in the pattern of the cames, said method further comprising the step of inverting said flanges for said one side of the glass pieces prior to positioning them on the glass pieces, so that the upper surfaces of said flanges for said one side of the glass pieces when in the mold become the surfaces thereof engaging the upper surfaces of the glass pieces.

4. The method of claim 1 wherein the cross-section of the grooving in the mold and the flanges formed therein are symmetrical about a central grooving plane parallel to the upper face of the mold.

5. The method of claim 1 wherein the moldable material is a two-part epoxy resin.

6. The method of claim 1 wherein the upper face of the mold is of silicone rubber.

* * * * *